(12) United States Patent
Iijima

(10) Patent No.: US 8,052,948 B2
(45) Date of Patent: Nov. 8, 2011

(54) $CO_2$ RECOVERY SYSTEM AND $CO_2$ RECOVERY METHOD

(75) Inventor: Masaki Iijima, Hiroshima (JP)

(73) Assignees: Mitsubishi Heavy Industries, Ltd., Tokyo (JP); The Kansai Electric Power Co., Inc., Osaka (JP)

( * ) Notice: Subject to any disclaimer, the term of this patent is extended or adjusted under 35 U.S.C. 154(b) by 0 days.

(21) Appl. No.: 11/896,731

(22) Filed: Sep. 5, 2007

(65) Prior Publication Data
US 2008/0056972 A1   Mar. 6, 2008

(30) Foreign Application Priority Data

Sep. 6, 2006  (JP) ................................. 2006-241895

(51) Int. Cl.
| | |
|---|---|
| B01D 47/00 | (2006.01) |
| B01D 53/46 | (2006.01) |
| B01D 53/56 | (2006.01) |
| B01D 53/86 | (2006.01) |
| B01D 53/14 | (2006.01) |
| B01D 50/00 | (2006.01) |
| B01D 53/34 | (2006.01) |
| B01D 19/00 | (2006.01) |
| B01D 47/02 | (2006.01) |
| B01J 8/00 | (2006.01) |
| B01J 10/00 | (2006.01) |
| C01B 17/16 | (2006.01) |
| C01B 31/20 | (2006.01) |
| F01N 3/00 | (2006.01) |
| F23J 11/00 | (2006.01) |

(52) U.S. Cl. ........ 423/220; 423/210; 423/228; 422/168; 422/187; 95/179; 95/223; 95/178; 96/242

(58) Field of Classification Search .................. 423/210, 423/228, 220; 422/168, 187; 95/179, 242, 95/223, 178; 96/242, 235
See application file for complete search history.

(56) References Cited

U.S. PATENT DOCUMENTS

| | | | |
|---|---|---|---|
| 3,932,582 | A | 1/1976 | Eickmeyer |
| 5,145,658 | A | 9/1992 | Chao |
| 5,344,627 | A | 9/1994 | Fuji et al. |
| 5,520,894 | A | 5/1996 | Heesink et al. |

(Continued)

FOREIGN PATENT DOCUMENTS

DE     3627777 A1    2/1988

(Continued)

OTHER PUBLICATIONS

English translation of JP 2004-323339.*

(Continued)

*Primary Examiner* — Jerry A Lorengo
*Assistant Examiner* — Jennifer Smith
(74) *Attorney, Agent, or Firm* — Westerman, Hattori, Daniels & Adrian, LLP

(57) ABSTRACT

A $CO_2$ recovery system includes an absorption tower and a regeneration tower. $CO_2$ rich solution is produced in the absorption tower by absorbing $CO_2$ from $CO_2$-containing gas. The $CO_2$ rich solution is conveyed to the regeneration tower where lean solution is produced from the rich solution by removing $CO_2$. A compressor compresses $CO_2$ that is removed from the rich solution and discharged through a head of the regeneration tower. Heat is generated while the compressor compresses the $CO_2$. A heat supplying unit supplies the heat to the regeneration tower for heating the lean solution.

2 Claims, 4 Drawing Sheets

U.S. PATENT DOCUMENTS

| | | | |
|---|---|---|---|
| 5,832,712 | A | 11/1998 | Ronning et al. |
| 6,596,248 | B2 | 7/2003 | Schimkat et al. |
| 6,689,332 | B1 | 2/2004 | Yoshida et al. |
| 6,883,327 | B2 | 4/2005 | Iijima et al. |
| 7,022,168 | B2 | 4/2006 | Schimkat et al. |
| 7,128,777 | B2 | 10/2006 | Spencer |
| 2005/0132883 | A1 | 6/2005 | Su et al. |
| 2007/0053817 | A1 | 3/2007 | Iijima et al. |

FOREIGN PATENT DOCUMENTS

| | | |
|---|---|---|
| EP | 0551876 A2 | 7/1993 |
| EP | 1695756 A1 | 8/2006 |
| JP | 7-51537 A | 2/1995 |
| JP | 2004-323339 A | 11/2004 |
| WO | WO 2004/080573 A1 | 9/2004 |

OTHER PUBLICATIONS

Russian Office Action dated Aug. 15, 2006 (mailing date), issued in corresponding Russian Patent Application No. 2007133356/15 (036434).

European Search Report dated Dec. 20, 2007, issued in corresponding European Patent Application No. 07115804.

Decision of Grant dated Mar. 18, 2009 issued in corresponding Russian patent Application No. 2007133356.

* cited by examiner

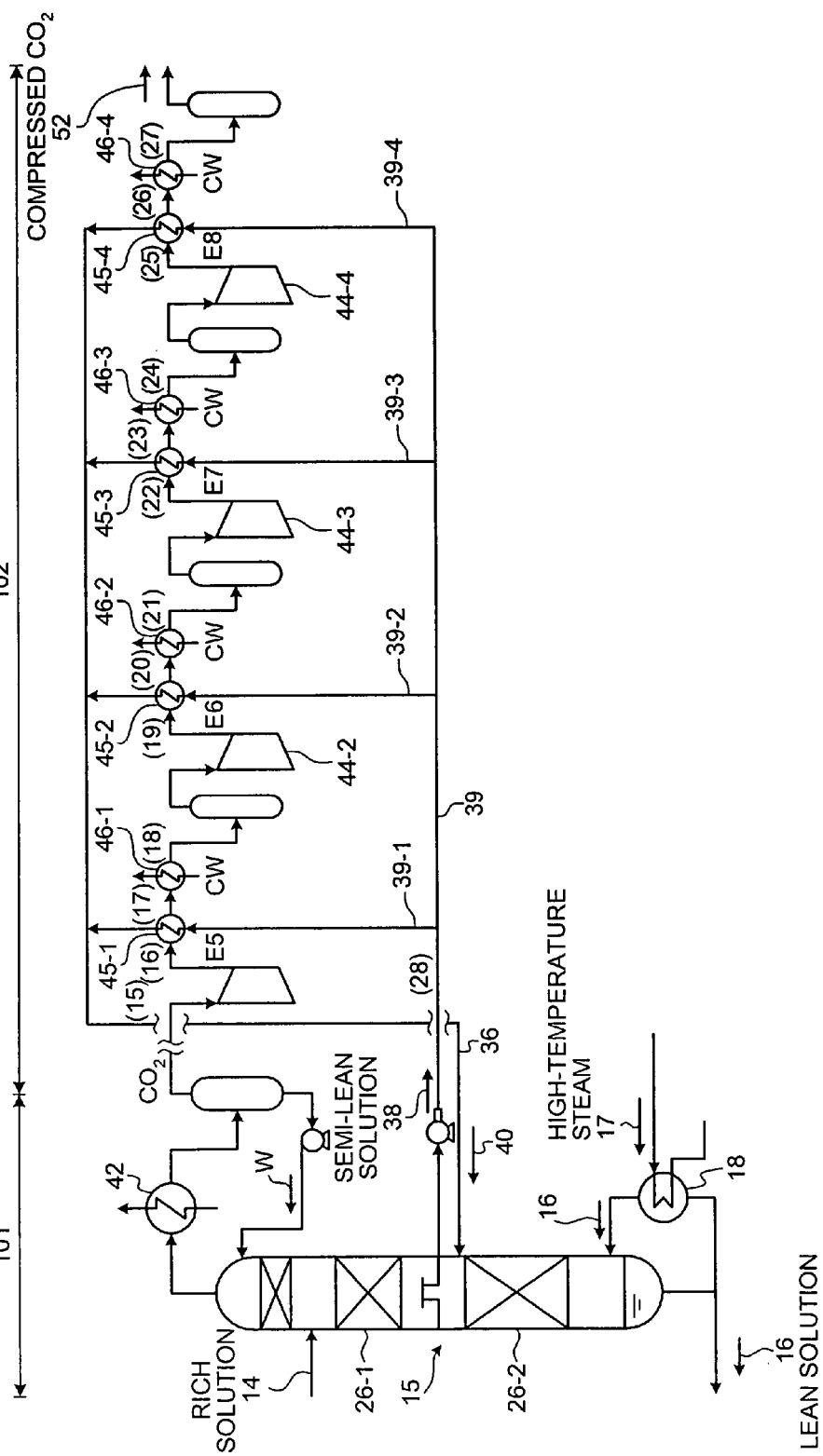

CO₂ RECOVERY SYSTEM AND CO₂ RECOVERY METHOD

BACKGROUND OF THE INVENTION

1. Field of the Invention

The present invention relates to a $CO_2$ recovery system and method for achieving energy saving.

2. Description of the Related Art

In recent years the greenhouse effect due to $CO_2$ has been pointed out as one of causes of the global warming, and a countermeasure against it is urgently required internationally to protect global environment. $CO_2$ sources range various fields of human activities, including burning of fossil fuels, and demands to suppress their $CO_2$ emission from these sources are on constant increase. In association with this, people have energetically studied means and methods for suppressing emission of $CO_2$ from power generation facilities such as power plants which use an enormous amount of fossil fuels. One of the methods includes bringing combustion exhaust gas of boilers into contact with an amine-based $CO_2$-absorbing solution. This method allows removal and recovery of $CO_2$ from the combustion exhaust gas. Another method includes storing recovered $CO_2$, i.e., not returning the recovered $CO_2$ to the atmosphere.

Various methods are known to remove and recover $CO_2$ from combustion exhaust gas using the $CO_2$-absorbing solution. Japanese Patent Application Laid-Open No. H7-51537 discloses a method of contacting the combustion exhaust gas with the $CO_2$-absorbing solution in an absorption tower, heating an absorbing solution having absorbed $CO_2$ in a regeneration tower, and releasing $CO_2$, regenerating the absorbing solution, and circulating the regenerated absorbing solution to the absorption tower again to be reused.

In the above conventional method, however, the steps of removing, and recovering $CO_2$ from $CO_2$-containing gas are provided additionally in combustion facilities, and hence, the operation costs should be reduced as much as possible. Particularly, among the processes, a regenerating process consumes a large amount of heat energy, and therefore, the regenerating process needs to be provided as an energy saving process as much as possible.

SUMMARY OF THE INVENTION

It is an object of the present invention to at least partially solve the problems in the conventional technology.

According to an aspect of the present invention, there is provided a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution. The $CO_2$ recovery system includes a compressor that compresses $CO_2$ that is removed from the rich solution and discharged through a head of the regeneration tower, wherein heat is generated while the compressor compresses the $CO_2$; and a heat supplying unit that supplies the heat to the regeneration tower for heating the lean solution.

According to another aspect of the present invention, there is provided a $CO_2$ recovery system including an absorption tower that receives $CO_2$-containing gas and $CO_2$-absorbing solution, and causes the $CO_2$-containing gas to come in contact with the $CO_2$-absorbing solution to produce $CO_2$ rich solution, and a regeneration tower that receives the rich solution and produces lean solution from the rich solution by removing $CO_2$ from the rich solution, wherein semi-lean solution is produced as an intermediate product before producing the lean solution from the rich solution. The $CO_2$ recovery system includes a compressor that compresses $CO_2$ that is removed from the rich solution and discharged through a head of the regeneration tower, wherein heat is generated while the compressor compresses the $CO_2$; and a heat supplying unit that supplies the heat to the regeneration tower for heating the semi-lean solution.

According to still another aspect of the present invention, a $CO_2$ recovery method including causing $CO_2$-containing gas to come in contact with $CO_2$-absorbing solution to produce $CO_2$ rich solution in an absorption tower, conveying the rich solution to a regeneration tower, and producing a lean solution from the rich solution by removing $CO_2$ from the rich solution in the regeneration tower. The $CO_2$ recovery method includes compressing $CO_2$ that is removed from the rich solution and discharged through a head of the regeneration tower, wherein heat is generated at the compressing; and supplying the heat to the regeneration tower for heating any one of the lean solution and semi-lean solution wherein the semi-lean solution is an intermediate product produced from the rich solution before producing the lean solution.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a schematic diagram of an example of a $CO_2$ recovery system shown in FIG. 2.

DETAILED DESCRIPTION OF THE PREFERRED EMBODIMENTS

Exemplary embodiments of the present invention are explained in detail below with reference to the accompanying drawings.

Figure 1:
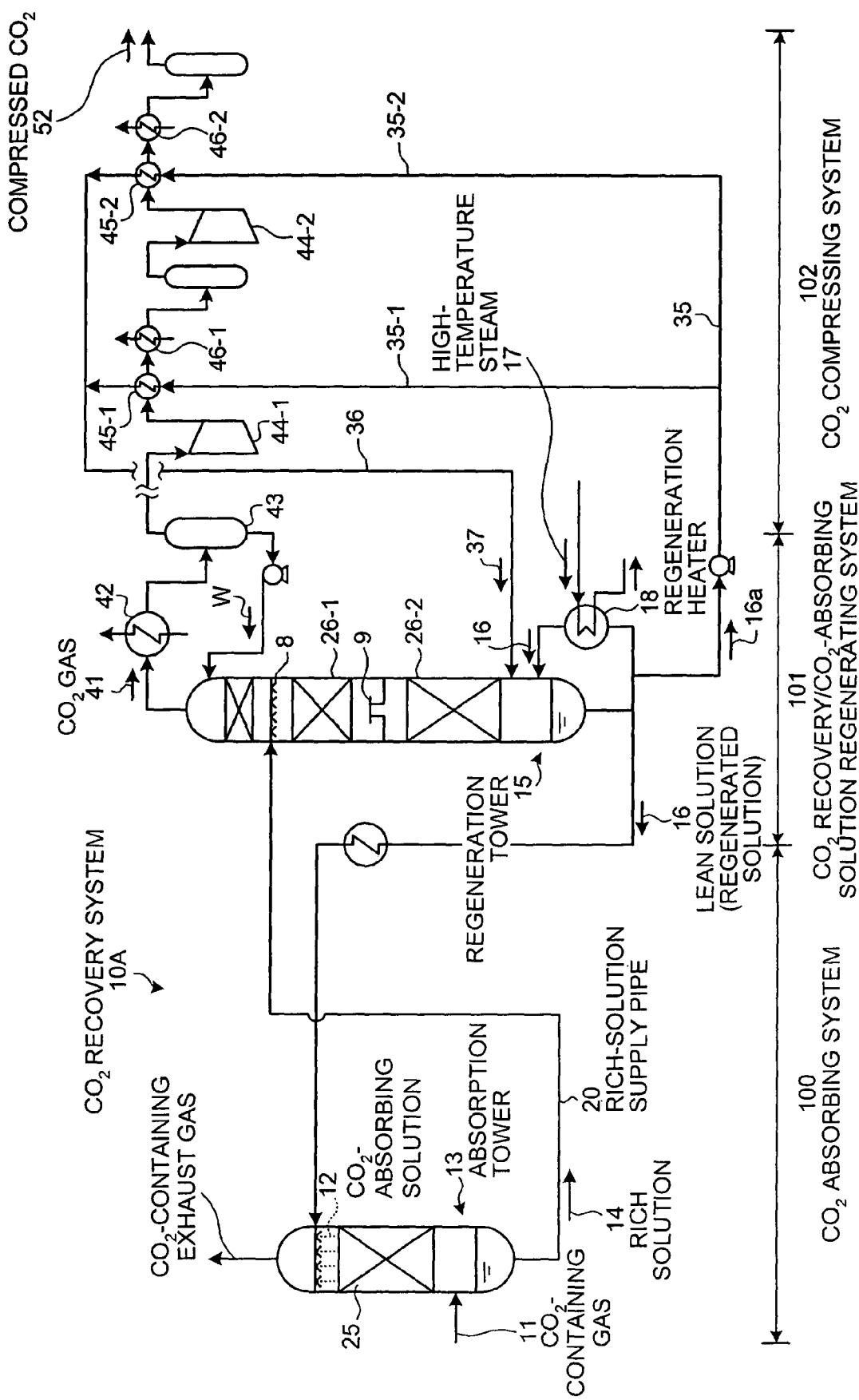
FIG. 1 is a schematic diagram of a $CO_2$ recovery system according to a first embodiment of the present invention.

FIG. 1 is a schematic diagram of a $CO_2$ recovery system 10A according to a first embodiment of the present invention.

As shown in FIG. 1, the $CO_2$ recovery system 10A includes an absorption tower 13 where a $CO_2$-absorbing solution 12 contacts with $CO_2$-containing gas 11 containing $CO_2$ thereby absorbing $CO_2$ from the $CO_2$-containing gas 11, and a regeneration tower 15 where a regeneration heater 18 supplies high-temperature steam 17 to a rich solution 14, which is the $CO_2$-absorbing solution 12 after absorbing $CO_2$, thereby generating a lean solution (regenerated solution) 16. The lean solution 16, a resultant generated by removing $CO_2$ from the rich solution 14 in the regeneration tower 15, is reused in the absorption tower 13. A part 16a of the lean solution 16 is extracted through a bifurcated path 35 (35-1, 35-2), and is heat-exchanged with compression heat that is generated when $CO_2$ gas 41, which is released from a head of the regeneration tower 15, is compressed by a compressor. Heated lean solution 37 is supplied again to the regeneration tower 15, through a circulating path 36.

The $CO_2$ recovery system 10A includes a $CO_2$ absorbing system 100 that absorbs $CO_2$ in the absorption tower 13, a $CO_2$ recovery/$CO_2$-absorbing solution regenerating system 101 that recovers $CO_2$ and regenerates $CO_2$-absorbing solution in the regeneration tower 15, and a $CO_2$ compressing system 102 that compresses recovered $CO_2$ so that the $CO_2$ can be poured into the earth or into an oilfield.

In the $CO_2$ absorbing system 100, first, the $CO_2$-containing gas 11 in the absorption tower 13 is brought into countercurrent contact with the $CO_2$-absorbing solution 12 such as an alkanolamine-based solution. $CO_2$ in the $CO_2$-containing gas 11 is absorbed into the $CO_2$-absorbing solution 12 due to chemical reaction ($R-NH_2+H_2O+CO_2 \rightarrow R-NH_3HCO_3$). Thereafter, remaining $CO_2$-containing exhaust gas, from which $CO_2$ has been removed, rises up a washing portion (not shown), and is released from a head of the absorption tower 13.

In the $CO_2$ recovery/$CO_2$-absorbing solution regenerating system 101, the regeneration tower 15 is supplied with the rich solution 14 that is poured through the head of the regeneration tower 15. Thereafter, the rich solution 14 poured into the regeneration tower 15 through the head releases large part of $CO_2$ during heat absorption. The $CO_2$-absorbing solution that has released part or large part of $CO_2$ in the regeneration tower 15 is called a semi-lean solution (not shown). By the time the semi-lean solution reaches the bottom of the regeneration tower 15, the semi-lean solution turns into the lean solution 16 that contains almost no $CO_2$. The lean solution 16 is heated by the high-temperature steam 17 coming from the regeneration heater 18.

In the $CO_2$ compressing system 102, the $CO_2$ gas 41 is released from the head of the regeneration tower 15 along with water vapor via a gas discharging line. A condenser 42 condenses the water vapor released along within the $CO_2$ gas 41. After the water is separated from the $CO_2$ gas 41 in a separation drum 43, the $CO_2$ gas 41 is compressed in a first compressor 44-1 and a second compressor 44-2 and is collected as compressed $CO_2$ 52. Water W separated in the separation drum 43 is supplied to an upper portion of the regeneration tower 15.

In addition, the absorption tower 13 includes a filling layer 25; the regeneration tower 15 includes a nozzle 8 for supplies the rich solution to the regeneration tower 15, a chimney tray 9, and filling layers 26-1 and 26-2.

The $CO_2$ gas 41, which is released along with the water vapor, is compressed by the first compressor 44-1 and the second compressor 44-2. A first heat exchanger 45-1 and a second heat exchanger 45-2 are located downstream of the first compressor 44-1 and the second compressor 44-2, respectively. The part 16a of the lean solution 16 is supplied through the bifurcated path 35 (35-1, 35-2) to each of the heat exchangers, so as to increase the temperature. The number of the compressor can be determined according to the proportion of compression.

The heated lean solution 37 that is heated by each of the first heat exchanger 45-1 and the second heat exchanger 45-2 is supplies to the regeneration tower 15. As a result, the heat is transferred to the regeneration tower 15, which makes it possible to reduce energy consumption in the regenerating system.

A part of the compressed $CO_2$ 52 is cooled by the part 16a of the lean solution 16. Therefore, coolant water or cold energy that is used in a first cooler 46-1 and a second cooler 46-2 located downstream can be reduced.

The heat exchanger is not particularly limited to the one described in the first embodiment. In other words, known heat exchangers such as a plate heat exchanger and a shell and tube heat exchanger can be used.

The $CO_2$-absorbing solution used in the present invention is not particularly limited. For example, a hindered amine group having alkanolamine and alcoholic hydroxyl can be used. Examples of the alkanolamine include monoethanolamine, diethanolamine, triethanolamine, methyldiethanolamine, diisopropanolamine, and diglycolamine; however, generally, monoethanolamine (MEA) is preferably used. Examples of the hindered amine having alcoholic hydroxyl include 2-amino-2-methyl-1-propanol (AMP), 2-(ethylamino)-ethanol (EAE), and 2-(methylamino)-ethanol (MAE).

Figure 2:
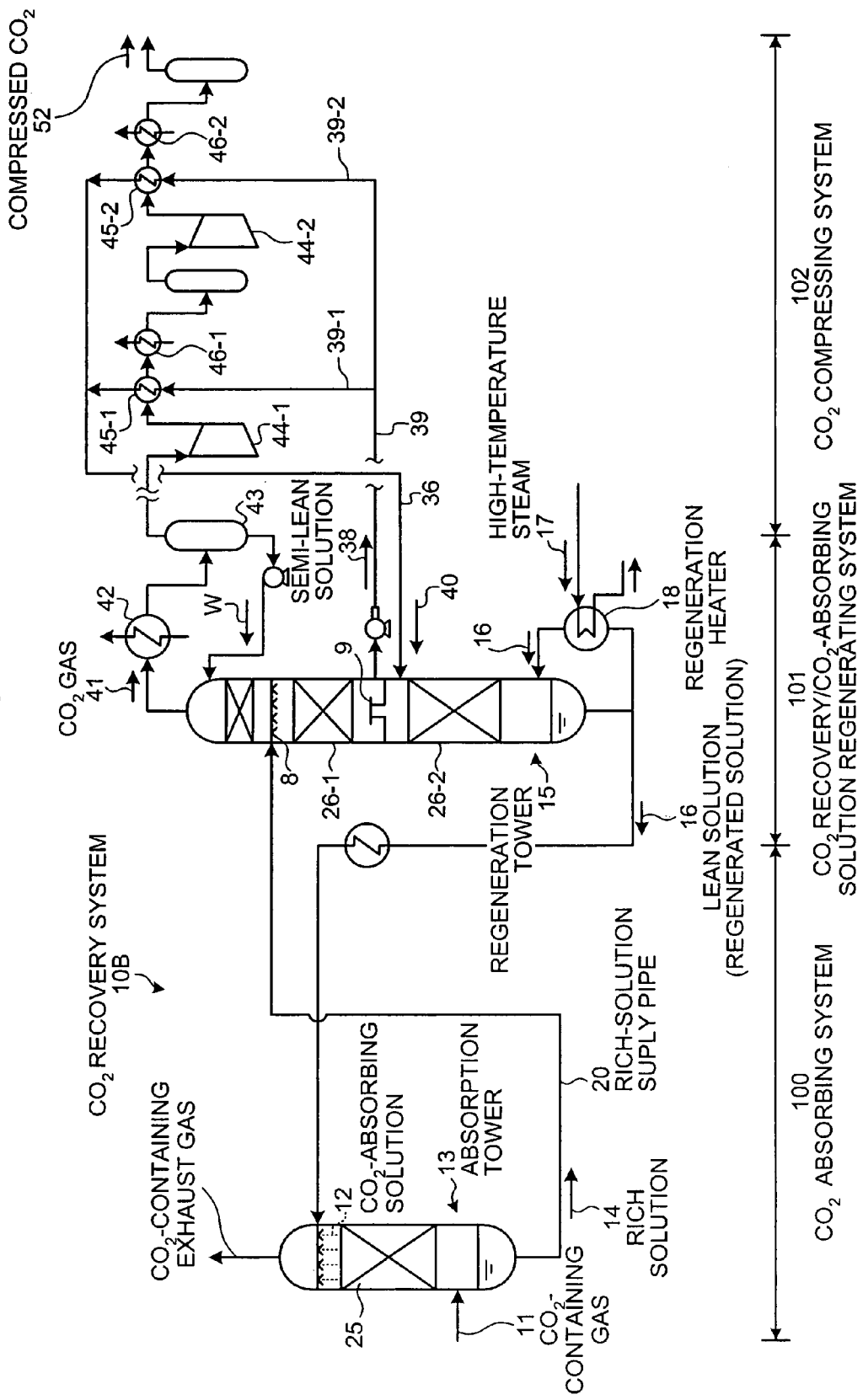
FIG. 2 is a schematic diagram of a $CO_2$ recovery system according to a second embodiment of the present invention.

FIG. 2 is a schematic diagram of a $CO_2$ recovery system 10B according to a second embodiment of the present invention. Components the same as those of the $CO_2$ recovery system according to the first embodiment are assigned with the same reference numerals, and explanation thereof is omitted.

As shown in FIG. 2, the $CO_2$ recovery system 10B extracts through an extracting path 39 (39-1, 39-2) a semi-lean solution 38 obtained by removing part of $CO_2$ from the rich solution 14 in mid-course of the regeneration tower 15, and supplies the semi-lean solution 38 to the first heat exchanger 45-1 and the second heat exchanger 45-2. After the heat-exchange, the semi-lean solution 38 becomes a heated semi-lean solution 40, and the heated semi-lean solution 40 is supplied to the regeneration tower 15. Consequently, because heat is transferred to the regeneration tower 15, energy consumption in the regenerating system is reduced.

When the semi-lean solution colder than the lean solution is heated and is introduced into the regeneration tower 15, and heat is transferred to the regeneration tower 15 through the heated semi-lean solution. Thus, energy consumption in the regeneration system is further reduces than that of the regenerating system in the first embodiment.

Explained below are examples of the embodiments. However, the present invention is not limited to the examples.

Figure 3:
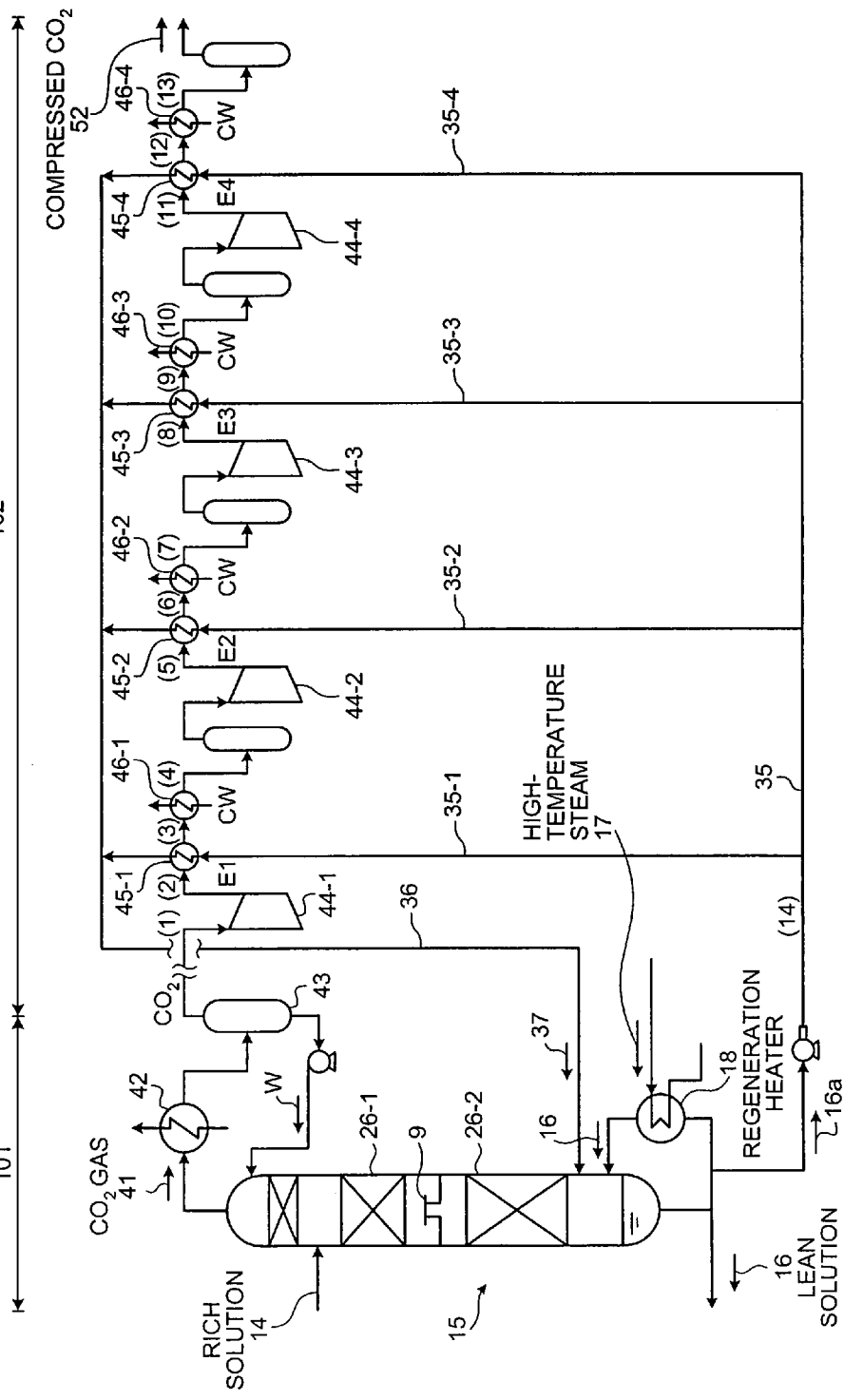
FIG. 3 is a schematic diagram of an example of the $CO_2$ recovery system shown in FIG. 1.

FIG. 3 is a schematic diagram of an example of the $CO_2$ recovery system 10A.

In the example, $CO_2$ recovered from the regeneration tower 15 is compressed by four compressors (first compressor 44-1 to fourth compressor 44-4). Four heat exchangers (first heat exchanger 45-1 to fourth heat exchanger 45-4) and four coolers (first cooler 46-1 to fourth cooler 46-4) are located downstream of the four compressors, respectively. The part 16a of the lean solution 16 is supplied through the bifurcated path 35 (35-1, 35-2, 35-3, and 35-4) to each of the heat exchangers 45 (45-1, 45-2, 45-3, and 45-4).

The stream numbers (1) to (14) are points where temperature, pressure, and flow rate of each of the stream is measured. The measurement results are depicted in Table 1.

TABLE 1

| | Stream No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Temperature (° C.) | 35 | 144 | 130 | 35 | 166 | 130 | 35 | 172 | 130 | 35 | 159 | 130 | 35 | 120 |
| Pressure (bar G.) | 0.5 | 7.8 | 7.6 | 7.4 | 16.0 | 15.8 | 15.2 | 59 | 58.6 | 58.2 | 201 | 200.5 | 200.0 | 3.0 |
| Flow rate (T/H) | 137 | 137 | 137 | 137 | 135 | 135 | 135 | 135 | 135 | 135 | 135 | 135 | 135 | 500 |

Amount of heat (E1 to E4) recovered from the absorbing solution in each of the heat exchangers 45-1 to 45-4 was $E1=0.5\times10^6$ kcl/h, $E2=1.3\times10^6$ kcl/h, $E3=1.7\times10^6$ kcl/h, $E4=2.1\times10^6$ kcl/h, and the total was $5.6\times10^6$ kcl/h.

When there was no heat recovery, the amount of heat in the regeneration heater 18 was $101.3\times10^6$ kcl/h, while when there was heat recovery, the amount of heat in the regeneration heater 18 was $95.7\times10^6$ kcl/h, decreasing 5.5%.

FIG. 4 is a schematic diagram of an example of the $CO_2$ recovery system 10B.

In the example, $CO_2$ recovered from the regeneration tower 15 is compressed by four compressors (first compressor 44-1 to fourth compressor 44-4). Four heat exchangers (the first heat exchanger 45-1 to the fourth heat exchanger 45-4) and four coolers (the first cooler 46-1 to the fourth cooler 46-4) are located downstream of the four compressors, respectively. The semi-lean solution 38 is supplied through the bifurcated path 35 (35-1, 35-2, 35-3, and 35-4) to each of the heat exchangers 45 (45-1, 45-2, 45-3, and 45-4).

The stream numbers (15) to (28) are points where temperature, pressure and flow rate of each of the stream is measured. The measurement results are depicted in Table 2.

TABLE 2

| | Stream No. | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Temperature (° C.) | 35 | 144 | 110 | 35 | 166 | 100 | 35 | 172 | 110 | 35 | 159 | 110 | 35 | 100 |
| Pressure (bar G.) | 0.5 | 7.8 | 7.6 | 7.4 | 15.0 | 15.8 | 15.2 | 59 | 58.6 | 58.2 | 201 | 200.5 | 200.0 | 3.0 |
| Flow rate (T/H) | 137 | 137 | 137 | 137 | 135 | 135 | 135 | 135 | 135 | 135 | 135 | 135 | 135 | 900 |

Amount of heat (E5 to E8) recovered from the absorbing solution in each of the heat exchangers 45-1 to 45-4 was $E5=1.3\times10^6$ kcl/h, $E6=2.1\times10^6$ kcl/h, $E7=2.4\times10^6$ kcl/h, $E8=3.5\times10^6$ kcl/h, and the total was $9.3\times10^6$ kcl/h.

When there was no heat recovery, the amount of heat in the regeneration heater 18 was $101.3\times10^6$ kcl/h, while when there is heat recovery, the amount of heat in the regeneration heater 18 was $92.0\times10^6$ kcl/h, decreasing about 9.2%.

Thus, reduction in the energy consumption rate (of about 9%) in the regenerating system could be achieved by transferring heat in the regeneration tower 15 through introduction of heated semi-lean solution, which was colder than the lean solution, rather than heating the lean solution as in the first embodiment.

According to an embodiment of the present invention, it is possible to provide a $CO_2$ recovery system and a $CO_2$ recovery method capable of achieving energy saving by using heat generated during compression of $CO_2$ that is released from a regeneration tower.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A $CO_2$ recovery system including
an absorption tower that
  receives $CO_2$-containing gas and $CO_2$-absorbing solution, and
  causes the $CO_2$-containing gas to come in contact with the $CO_2$-absorbing solution to produce $CO_2$ rich solution, and
a regeneration tower that
  receives the rich solution and
  produces lean solution from the rich solution by removing $CO_2$ from the rich solution, wherein semi-lean solution is produced as an intermediate product before producing the lean solution from the rich solution,
the $CO_2$ recovery system comprising:
a condenser that receives $CO_2$ removed from the rich solution and discharged through a head of the regeneration tower, and that condenses water vapor released along with the $CO_2$ into water;
a separation drum that receives the $CO_2$ from the condenser and separates the water from the $CO_2$;
two or more compressors that compress the $CO_2$ from the separation drum, wherein heat is generated while each compressor compresses the $CO_2$;
a heat supplying unit that supplies the heat to the regeneration tower for heating any one of the lean solution and the semi-lean solution;
a bifurcated path through which any one of a part of the lean solution extracted from a portion of bottom of the regeneration tower and the semi-lean solution extracted from a midcourse of the regeneration tower bifurcates and passes;
a circulating path suitable for extracting any one of the part of the lean solution and the semi-lean solution through the bifurcated path, heat-exchanging with compression heat that is generated when $CO_2$ gas, which is released from a head of the regeneration tower is compressed by each compressor, and supplying again any one of the heated part of the lean solution and the semi-lean solution to the regeneration tower therethrough; and at least two heat exchangers that are located on intersections between the bifurcated path and a path suitable for conveying the $CO_2$ gas discharged from the top of the regeneration tower capable of transferring the heat to any one of the part of the lean solution or the semi-lean solution, wherein the condenser, the separation drum, the compressors, and the heat exchangers are located on the $CO_2$ gas conveying path.

2. A $CO_2$ recovery method comprising:

causing $CO_2$-containing gas to come in contact with $CO_2$-absorbing solution to produce $CO_2$ rich solution in an absorption tower, conveying the rich solution to a regeneration tower, and producing a lean solution from the rich solution by removing $CO_2$ from the rich solution in the regeneration tower, wherein semi-lean solution is produced as an intermediate product before producing the lean solution from the rich solution receiving the $CO_2$ removed from the rich solution and discharged through a head of the regeneration tower, and condensing water vapor released along with the $CO_2$ into water;

receiving the $CO_2$ after water vapor is condensed and separating the water from the $CO_2$;

compressing, using two or more compressors, the $CO_2$ from which the water is separated, wherein heat is generated at the compressing;

transferring the heat to any one of a part of the lean solution extracted from a portion of bottom of the regeneration tower and a part of the semi-lean solution extracted from a midcourse of the regeneration tower;

bifurcating any one of the part of the lean solution and the semi-lean solution so as to be flowed into a bifurcated path;

exchanging heat between any one of the part of the lean solution and the semi-lean solution on a circulating path and a path suitable for conveying the $CO_2$ gas from the head of the regeneration tower, wherein the circulating path is a path suitable for extracting any one of the part of the lean solution and the semi-lean solution through the bifurcated path, heat-exchanging with compression heat that is generated when $CO_2$ gas, which is released from the head of the regeneration tower, is compressed by each compressor and supplying again any one of the heated part of the lean solution and the semi-lean solution to the regeneration tower therethrough; and returning any one of the part of the lean solution and the semi-lean solution heated in the transferring to the regeneration tower to supply heat to the regeneration tower for heating.

\* \* \* \* \*